(12) United States Patent
Beltowski et al.

(10) Patent No.: US 7,516,367 B1
(45) Date of Patent: Apr. 7, 2009

(54) AUTOMATED, DISTRIBUTED PROBLEM DETERMINATION AND UPGRADE PLANNING TOOL

(75) Inventors: Piotr Beltowski, Cracow (PL); Wojciech Kocjan, Rybnik (PL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/130,750

(22) Filed: May 30, 2008

(51) Int. Cl.
*G06F 11/00* (2006.01)

(52) U.S. Cl. .......................... 714/38; 717/168; 717/174

(58) Field of Classification Search .................... 714/38
See application file for complete search history.

(56) References Cited

U.S. PATENT DOCUMENTS

| | | | |
|---|---|---|---|
| 6,438,749 B1* | 8/2002 | Chamberlain | 717/174 |
| 2003/0028825 A1 | 2/2003 | Hines | |
| 2004/0060044 A1* | 3/2004 | Das et al. | 717/171 |
| 2005/0066233 A1* | 3/2005 | Day et al. | 714/38 |
| 2005/0071838 A1* | 3/2005 | Hatasaki | 717/168 |
| 2005/0257214 A1* | 11/2005 | Moshir et al. | 717/171 |
| 2006/0041936 A1* | 2/2006 | Anderson et al. | 726/11 |
| 2006/0136898 A1 | 6/2006 | Bosscha et al. | |
| 2007/0033445 A1 | 2/2007 | Hirsave | |
| 2007/0033635 A1 | 2/2007 | Hirsave | |
| 2007/0074205 A1 | 3/2007 | Tammana et al. | |
| 2008/0133650 A1* | 6/2008 | Saarimaki et al. | 709/203 |
| 2008/0240401 A1* | 10/2008 | Mergen et al. | 379/243 |

* cited by examiner

*Primary Examiner*—Scott Baderman
*Assistant Examiner*—Kamini Patel
(74) *Attorney, Agent, or Firm*—McGinn Ip Law Group, PLLC

(57) ABSTRACT

A method of verifying an update to a computer software application running on a machine in a network having a plurality of machines, the method including applying a selected one in a series of a plurality of patches for an application, determining if the application behaves correctly after installing the selected one in the series of patches by test running the application and by determining if a functionality of the application changes, gathering outputs from the determining, applying additional ones of the series of the plurality of patches for the application, rolling back the applied patches after a set of checks has been made to return said application to an original state, creating a results file from the gathered outputs, identifying an exact patch level required to correct a problem with the application, verifying that the identified exact patch does not cause a compatibility problem, and analyzing results files from multiple machines to determine possible patch levels that resolve issues and cause no new problems.

1 Claim, 4 Drawing Sheets

Fig. 4
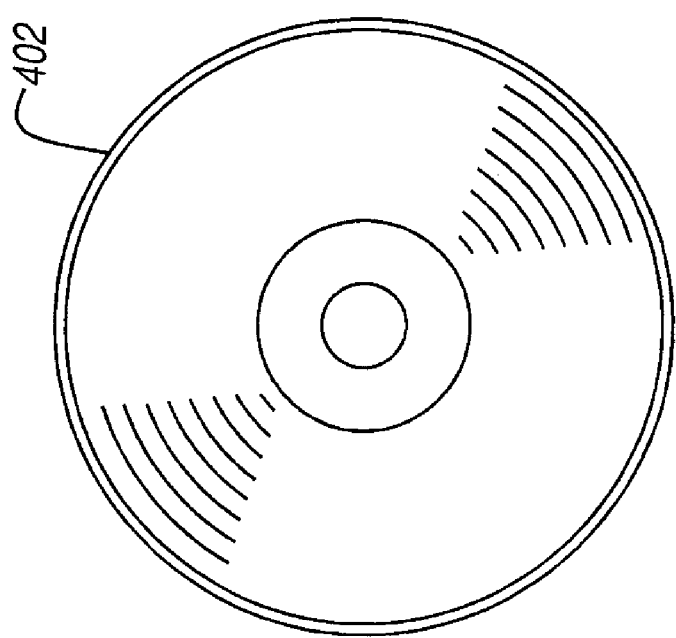
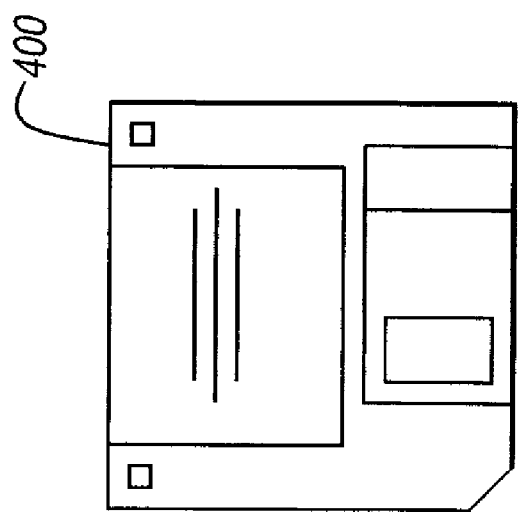

AUTOMATED, DISTRIBUTED PROBLEM DETERMINATION AND UPGRADE PLANNING TOOL

BACKGROUND OF THE INVENTION

1. Field of the Invention

The present invention generally relates to a method and apparatus for updating computers, and more specifically to a system and method for automatically updating and repairing computers.

2. Description of the Related Art

Software vendors offering support for their products often deal with incidents related to software failure or incorrect results. When particular software is offered to a wide range of customers, there is a high probability that a problem (i.e., a common problem) has already been encountered and solved when dealing with a different customer.

At the same time, non-technical support personnel are frequently not able to locate actual problems. Thus, either the customer is asked to repeatedly install patches (i.e., software portions designed to be inserted into existing software programs to overcome identified problems) or technical personnel are involved to help determine if a particular incident is a problem and has already been solved.

Another problem is being able to verify if the patch (i.e., the "fix") would work on a larger number of machines, without having to manually test the fix on each of the machines affected.

SUMMARY OF THE INVENTION

In view of the foregoing, and other exemplary problems, drawbacks, and disadvantages of the conventional systems, it is an exemplary feature of the present invention to provide a method of verifying an update to a computer software application running on a machine in a network having a plurality of machines, the method including applying a selected one in a series of a plurality of patches for an application, determining if the application behaves correctly after installing the selected one in the series of patches by test running the application and by determining if a functionality of the application changes, gathering outputs from the determining, applying additional ones of the series of the plurality of patches for the application, rolling back the applied patches after a set of checks has been made to return said application to an original state, creating a results file from the gathered outputs, identifying an exact patch level required to correct a problem with the application, verifying that the identified exact patch does not cause a compatibility problem, and analyzing results files from multiple machines to determine possible patch levels that resolve issues and cause no new problems. A client-server-based mechanism manages and performs tests on a set of machines associated with the application.

BRIEF DESCRIPTION OF THE DRAWINGS

The foregoing and other purposes, aspects and advantages will be better understood from the following detailed description of an exemplary embodiment of the invention with reference to the drawings, in which:

FIG. 4 illustrates a magnetic data storage diskette 400 to store the method 100.

DETAILED DESCRIPTION OF EXEMPLARY EMBODIMENTS OF THE INVENTION

Figure 1:
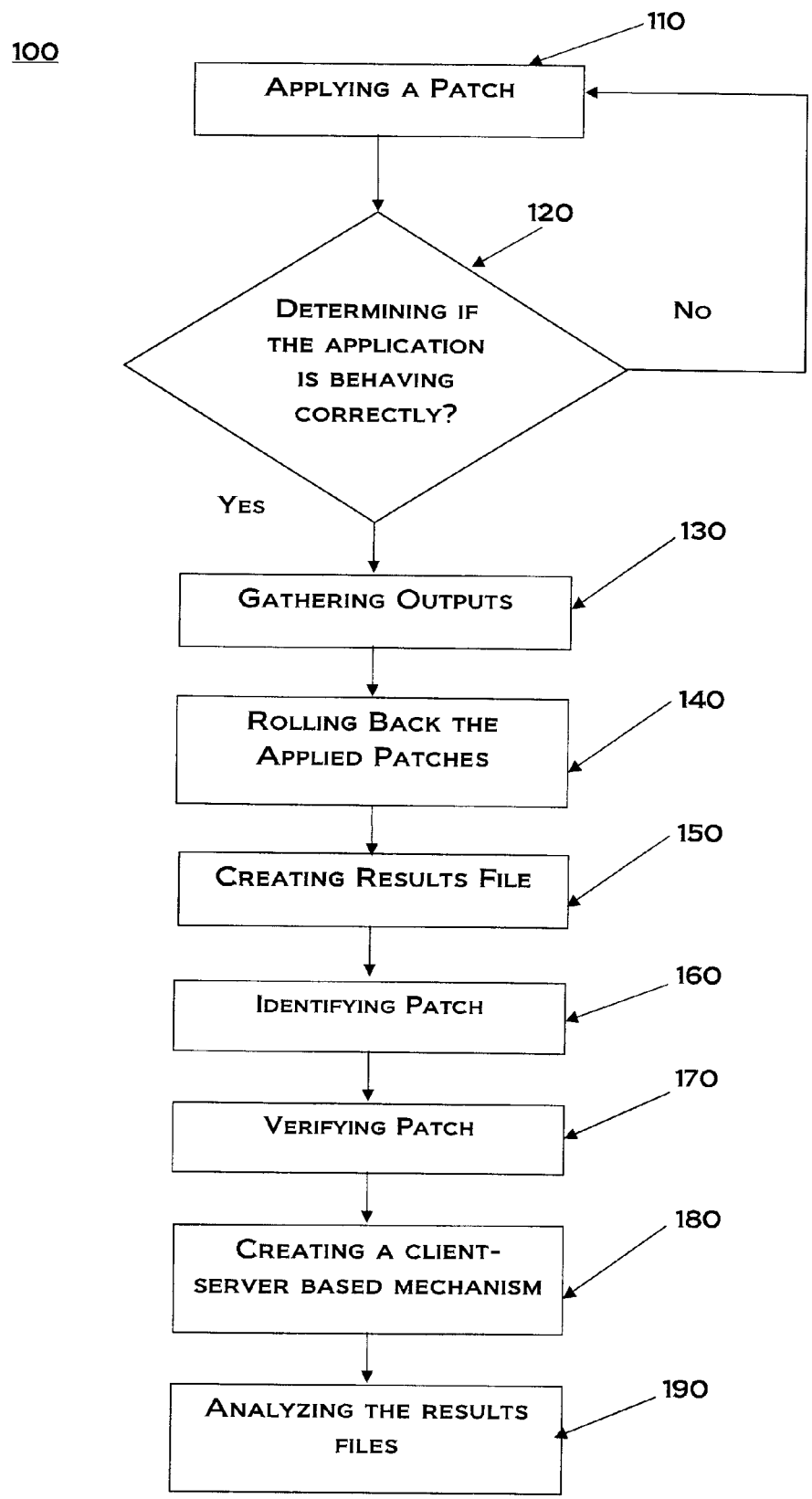
FIG. 1 illustrates an exemplary method 100 for verifying an update to an application.

Referring now to the drawings, and more particularly to FIGS. 1-4, there are shown exemplary embodiments of the method and structures according to the present invention.

FIG. 1 illustrates an exemplary method 100 for verifying an update to an application. Referring to FIG. 1, method 100 exemplarily includes applying one in a series of a plurality of "patches" for an application to an application in Step 110.

The patch could exemplarily be applied to one or several applications provided on one or several different PC's. In addition, each patch may be applied to an individual PC of the several different PC's based on that PC's operating system, configuration, etc.

Exemplarily, the patch that is applied in Step 110 is one of several consecutive patches for that application and PC. That is, exemplarily, the applied patch is one in a series of patches. For example, in some embodiments, the patches may include Patch 1.0, Patch 1.1, Patch 1.2, and Patch 1.3. Exemplarily, the patches would be applied in order throughout method 100.

After the application of the patch in Step 110, method 100 determines if the application behaves correctly (i.e., properly) after installation of the patch in Step 120. For example, method 100 would exemplarily test-run the application in each of the PC's on which the patch is installed. In some embodiments, the functionality of the application may be tested.

After the determining of Step 120, if it is determined that the application is behaving correctly, then the method 100 would exemplarily assume that the proper patch has been applied. Method 100 would exemplarily begin gathering outputs from the tests of the determining process of Step 120 in Step 130. The gathering of Step 130 would exemplarily include application output and performance data.

Method 100 would exemplarily begin applying another one of the series of the plurality of patches for the application by repeating and returning to Step 110. For example, the determination process of Step 120 would exemplarily include test running the application. In addition, the determination process of Step 120 would also exemplarily include determining if a functionality of the application changes because of the applied patches.

Once the gathering of outputs of Step 130 is completed, method 100 exemplarily rolls-back the applied patches from the applications in Step 140. By rolling-back the applied patches from the application, the application is returned to the earlier state before being patched. Accordingly, the applications would be returned to an original state. Exemplarily, these steps are performed automatically at the PC being rolled-back.

After the rolling back of the applied patches in Step 140, method 100 exemplarily creates a results file from the gathered outputs in Step 150. Creating the result file exemplarily would include finding patterns among the applications and the PC's. Such results may be ordered in terms of degree of correctness, or number of patches, etc.

In addition, method 100 exemplarily includes identifying an exact patch level required to correct the problem with the application in the PC's in Step 170. For example, the verification of Step 170 would include verifying that the identified exact patch does not cause a compatibility problem among applications on the PC.

After the patch level is verified in Step 170, method 100 would exemplarily include creating a client-server based mechanism for managing and performing the tests on a set of machines in Step 180.

In addition, method 100 would exemplarily analyze the results files from multiple machines to determine possible patch levels that resolve issues and do not cause new problems in Step 190.

Figure 2:
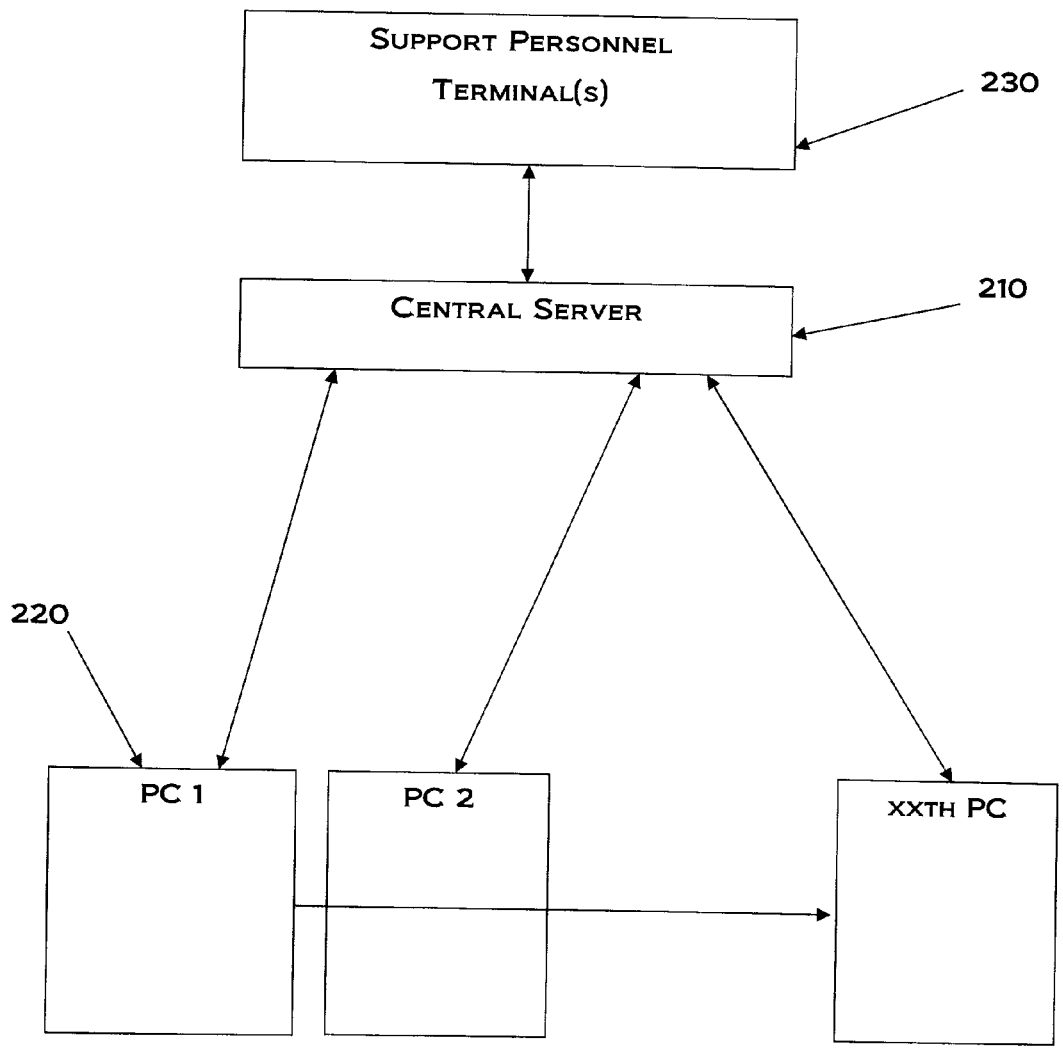
FIG. 2 illustrates an exemplary system 200 for verifying an update to an application among a plurality of PC's.

FIG. 2 illustrates an exemplary system 200 for verifying an update to an application among a plurality of PC's 220. Referring to FIG. 2, a plurality of PC's 220 are to have an application updated or repaired according to an exemplary embodiment of method 100 illustrated in FIG. 1.

System 200 may exemplarily include a central server 210. Server 210 is exemplarily associated with support personnel terminal(s) 230. In some embodiments, support personnel may include automated support equipment or software to analyze an update or a fix for an application.

In an exemplary embodiment, to repair a malfunctioning application in a plurality of PC's, a customer supplies information on the problem and the product or component that an PC malfunction incident is related to from one of the PC's 220 to support personnel terminal(s) 230. This information might also contain logs and traces from the application or product, detailed problem determination and/or steps to reproduce the problem.

In addition, customers might also request support for upgrade of the software so that support personnel terminal(s) 230 would be able to identify potential problems that would be caused by an update. This information would exemplarily be transmitted to support personnel terminal(s) 230 through central server 210.

Exemplarily, support personnel terminal(s) 230 analyze the information from the customer. Incidents that clearly map to invalid configuration and improper usage of the product should use different ways of determining potential issues. However, in case of verification of new versions, this step may not apply.

In addition, central server 210 is exemplarily associated with a plurality of PC's 220. For example, central server 210 may be in communications with any number of PC's. Each PC may exemplarily be running similar versions (i.e., same release versions) of an application to be repaired or upgraded. As a result, the method 100 can access data of an unlimited number of PC's to review and analyze data resulting from the application of the patches in Step 120.

Next, support personnel terminal(s) 230 would exemplarily identify probable code defects that might be related to the customer's reported incident based on the number of defects and time required to automatically verify them. In most cases, this will be a list of all defects excluding only those that clearly are not related to this issue. Since the process is automated, it would be better to select a larger number of defects than to excessively limit the number of defects that will be verified. In case of verification of new versions, this step may not apply.

Next, support personnel 230 create a diagnostic tool to verify identified defects based on an output from the previous step. Accordingly, a diagnostic tool is generated including one or more patches.

The diagnostic tool would exemplarily be a binary file with patches archives and/or JAVA Archives (JARs) attached within the binary file itself. The tool would exemplarily be created in such a way that the tool will not require any additional parameters or environment variables. The tool will exemplarily return an archive with all the results contained in it.

Exemplarily, the process of generating such diagnostic tools would be automated, which exemplarily should use a list of defects and other information as an input.

In addition, in a case of verification of new versions, the tool will include a version the customer is currently running, as well as a version to which a customer is planning to upgrade. Additional versions that arose between current and planned versions would exemplarily be included. For example if customer is planning upgrade from 5.0 to 5.3, it might also be wise to include 5.1 and 5.2 versions to be able to identify where the potential incompatibility or defect was introduced in.

After the tool is delivered to the customer, the tool is run on the machines that is failing or produces incorrect results/behavior. It might also be run on machines that are not currently affected by any problems, but the customer wishes to make sure that a fix does not break parts of the systems. In this case, the customer might either identify critical systems, customer support might identify systems that could be affected by the fix or customer might wish to deploy tests on all of the machines in the environment.

In case of verification of new versions, the customer might wish that a critical part of their infrastructure is verified not to cause any potential problems, or that the entire set of machines be verified.

As described with respect to method 100, the tool first may create and work on a copy of the product or back the product up. The tool might also enable more verbose logging if this functionality is offered by the product. The diagnostic tool then runs particular parts of the application and gathers both results and logs/traces. The tool then attempts to apply all included patches, one by one, and re-runs tests of part of the application along with gathering outputs, similar to first runs. After finishing all the tests, either a copy of the product is removed or the backup of the original product is restored. The diagnostic tool then creates an archive or package with collective information on all tests performed.

Exemplarily, after tests have been automatically conducted by customer, the resulting archives/packages should be analyzed by an automated tool. For verification of new versions, the tool would try to find differences in the output generated by the application. Information on which data should be compared and how it should be verified if it has changed would be embedded in the tool. It could be created as part of new version development process. It can also be customized or created on demand to handle key customers and issues specific to their environments.

For handling of problems, information on which data should be compared can either be prepared per incident or prepared to handle more common issues. The diagnostic tool should find results for which there were no changes in an application's behavior, as well as identifying changes in behavior between versions.

Exemplarily, comparing results from various versions is based on predefined grouping rules or algorithms using output and logs from applications. For applications that output data structures (such as Discovery Library Books®), it can be a set of rules on how to compare different results. Similar rules may then be applied when grouping results with same symptoms—specific values, behavior or entries in log files can be used to group results having the same symptoms.

A decision on whether to group results might also take a number of results into consideration. For example, if the number of results is quite low, it might be good to review all the results and logs by customer support personnel since it will not be so time-consuming.

Analyzing and grouping of the results from a previous step can be done either at a customer's side (site) or using customer support resources, depending on a size of all result archives/packages and computations needed to group the results.

An output returned by an automated analyzing tool is reviewed by support personnel 230. Results from diagnostic tools are received by customer support personnel and next steps are decided according to what the results are. If customer support found potential defects due to analyzing results, then the same mechanism could be reapplied in order to automatically retest fixes. If no problems are found or new behavior is correct, then a final report stating information on potential changes and/or fixes that need to be done may be prepared for the customer.

Figure 3:
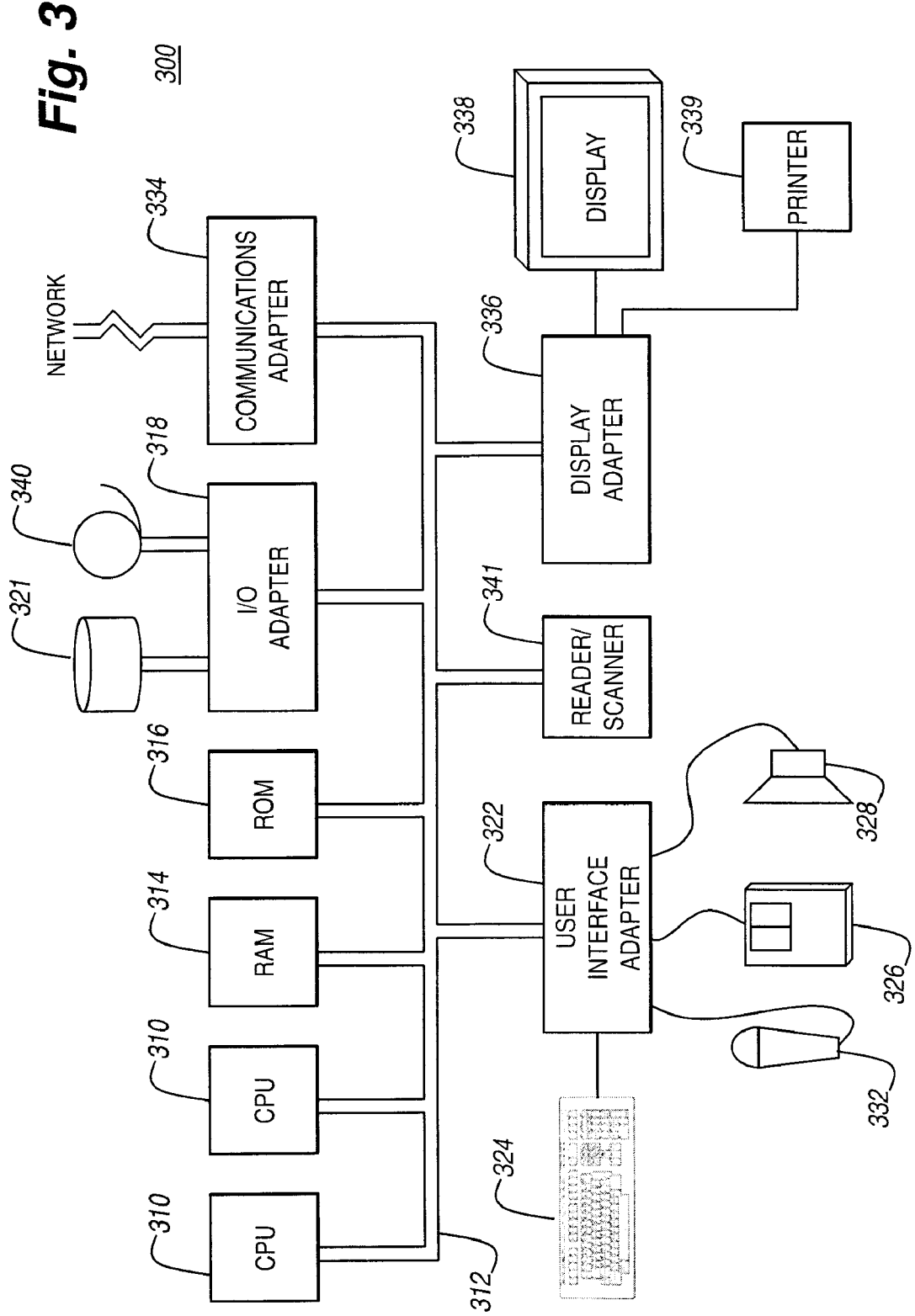
FIG. 3 illustrates a typical hardware configuration 300 which may be used for implementing the computer system and method according to the exemplary aspects of the present invention.

Referring now to FIG. 3, system 300 illustrates a typical hardware configuration which may be used for implementing the inventive system and method for buying and selling merchandise. The configuration has preferably at least one processor or central processing unit (CPU) 310. The CPUs 302 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, and Intranet, a personal area network (PAN), etc., and a display adapter 336 for connecting the bus 312 to a display device 338 and/or printer 339. Further, an automated reader/scanner 341 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating the CPU 310 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 310 and hardware above, to perform the method of the invention.

This signal-bearing media may include, for example, a RAM contained within the CPU 310, as represented by the fast-access storage for example. Alternatively, the instructions may be contained in another signal-bearing media, such as a magnetic data storage diskette 400 or CD-ROM 402, (FIG. 4), directly or indirectly accessible by the CPU 310.

Whether contained in the computer server/CPU 310, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

We claim:

1. A method of verifying an update to a computer software application running on a machine in a network having a plurality of machines, the method comprising:

applying a selected one in a series of a plurality of patches for an application;

determining if the application behaves correctly after installing the selected one in the series of patches by test running the application and by determining if a functionality of the application changes;

gathering outputs from the determining;

applying additional ones of the series of the plurality of patches for the application;

rolling back the applied patches including selected ones and additional ones after a set of checks has been made to return said application to an original state;

creating a results file from the gathered outputs;

identifying an exact patch level required to correct a problem with the application;

verifying that the identified exact patch does not cause a compatibility problem; and analyzing results files from multiple machines to determine possible patch levels that resolve issues and cause no new problems, wherein a client-server-based mechanism manages and performs tests on a set of machines associated with the application.

* * * * *